US012650097B1

(12) United States Patent
Bird

(10) Patent No.: US 12,650,097 B1
(45) Date of Patent: Jun. 9, 2026

(54) MAXIMUM DELIVERY ADIABATIC HOT-AIR ENGINE

(71) Applicant: David Glen Bird, Saratoga Springs, UT (US)

(72) Inventor: David Glen Bird, Saratoga Springs, UT (US)

( * ) Notice: Subject to any disclaimer, the term of this patent is extended or adjusted under 35 U.S.C. 154(b) by 0 days.

(21) Appl. No.: 19/089,050

(22) Filed: Mar. 25, 2025

(51) Int. Cl.
*F02G 1/055* (2006.01)

(52) U.S. Cl.
CPC .......... *F02G 1/055* (2013.01); *F02G 2270/55* (2013.01)

(58) Field of Classification Search
CPC ...... F02G 1/055; F02G 2270/55; F02G 1/043; F02G 2243/00; F02G 2243/02; F02G 2243/04; F02G 2243/06; F02G 2243/22; F02G 2243/24; F02G 2243/30; F02G 2243/32; F02G 2243/40; F02G 2270/005
See application file for complete search history.

(56) References Cited

U.S. PATENT DOCUMENTS

| | | | | |
|---|---|---|---|---|
| 2,803,951 A * | 8/1957 | Newton | F25B 31/00 | 417/539 |
| 3,636,719 A * | 1/1972 | Sato | F25B 9/14 | 60/521 |
| 4,416,114 A * | 11/1983 | Martini | F02G 1/043 | 60/517 |
| 4,662,176 A * | 5/1987 | Fujiwara | F02G 1/043 | 60/517 |
| 4,805,408 A * | 2/1989 | Beale | F02G 1/05 | 60/520 |
| 5,345,765 A * | 9/1994 | Kinnersly | F02G 1/0535 | 60/517 |
| 5,385,021 A * | 1/1995 | Beale | F02G 1/0435 | 60/520 |
| 6,877,315 B2 * | 4/2005 | Clark | F02G 1/055 | 60/517 |
| 10,890,138 B2 * | 1/2021 | Dann | F02G 1/053 | |
| 11,022,067 B2 * | 6/2021 | Dann | F02G 1/043 | |
| 11,384,746 B2 * | 7/2022 | St. George | F25B 30/02 | |
| 2003/0010200 A1 * | 1/2003 | Reithofer | F02B 75/36 | 92/130 R |
| 2012/0216538 A1 * | 8/2012 | Garaway | F02G 1/055 | 60/641.14 |
| 2018/0238265 A1 | 8/2018 | Johnston | | |

* cited by examiner

*Primary Examiner* — Jesse S Bogue

(57) ABSTRACT

A maximum delivery adiabatic reciprocal hot-air engine having a free interior space with a wider interior diameter than ends and an isolator-displacer having an aerodynamic exterior shape that mates with an interior shape of the hot and cold caps. The chamber and isolator-displacer are configured to isolate the hot or cold cap while exposing the volume of working fluid to the corresponding cold or hot cap. The chamber having a common space that is alternately heated or cooled by the respective hot or cold cap, The chamber is joined to a piston cylinder at the chamber's maximum interior diameter, with a volume of working fluid within the chamber communicating thermally with a piston through an opening at the common space wall. The volume of working fluid is adiabatically compressed and expanded to its intermediate temperature, thereby maximizing work and efficiency with the least amount of heat and the smallest dimensions.

20 Claims, 4 Drawing Sheets

MAXIMUM DELIVERY ADIABATIC HOT-AIR ENGINE

RELATED APPLICATIONS

This application claims the benefit of priority of U.S. Provisional Patent Application No. 63/572,186 filed Mar. 30, 2024, which is incorporated by reference herein in its entirety.

BACKGROUND OF THE INVENTION

Stirling's 1816 invention failed to address dead volume, which, next to internal temperature delta, has the most effect on hot-air engine power and efficiency; however, it did provide that "a large part of heat that would otherwise go to waste will be used many times over" (UK No. 4081).

Stirling's regenerator (ibid) and Philips Company's efforts to increase heating area and to pressurize hydrogen or helium "in excess of approximately 100 atmospheres absolute [101.1325 bars] and temperatures in excess of approximately 650° C. [920 K]" (U.S. Pat. No. 3,861,146, 1975) have led to dead volume of 58% of total volume in normal Stirling engine design practice with a 50% loss in power and a 20 to 30% loss in thermal efficiency (Koontragool "Thermodynamic analysis of a Stirling engine including dead volumes of hot space, cold space and regenerator", 2005). Further, resulting in the use of complex manufacturing processes and expensive construction materials to withstand these high temperatures and pressures, these processes and materials being unattractive to the mass manufacturing of these hot-air engines (U.S. Pat. No. 3,861,146, 1975).

In hot-air engines, "the use of the regenerator is advantageous when the engine does not give the maximum delivery", i.e., maximum work with the least amount of heat and the smallest dimensions (Röntgen *The Principles of Thermodynamics with Special Applications to Hot-Air, Gas and Steam Engines* pp. 241-243, and 248, 1880).

SUMMARY OF THE INVENTION

The present invention has for its object to mitigate these drawbacks by providing a low power (less than 10 hp) noncoaxial maximum delivery reciprocating hot-air engine that: has a dead volume (i.e., a constant volume of working fluid not alternately heated and cooled) less than 1% of total volume; maximizes work by expanding a volume of heated working fluid directly and with full effect; maximizes efficiency by preheating and precooling the volume of working fluid to intermediate temperatures with adiabatic processes; maximizes the interior temperature delta against the piston; and minimizes cost by being made with inexpensive mass manufacturing processes and construction materials that are easy to machine.

These and other objects are achieved by providing a hot-air engine with a minimal-sized chamber having a free interior space with a wider interior diameter than ends, an isolator-displacer with an exterior shape that mates with an interior shape of the hot and cold caps, a common space that is exposed alternately to either the hot cap or the cold cap, and a piston cylinder that communicates thermally with the volume of working fluid in the chamber through an opening at a common space wall that is the outer boundary of the common space.

DETAILED DESCRIPTION

Figure 1:
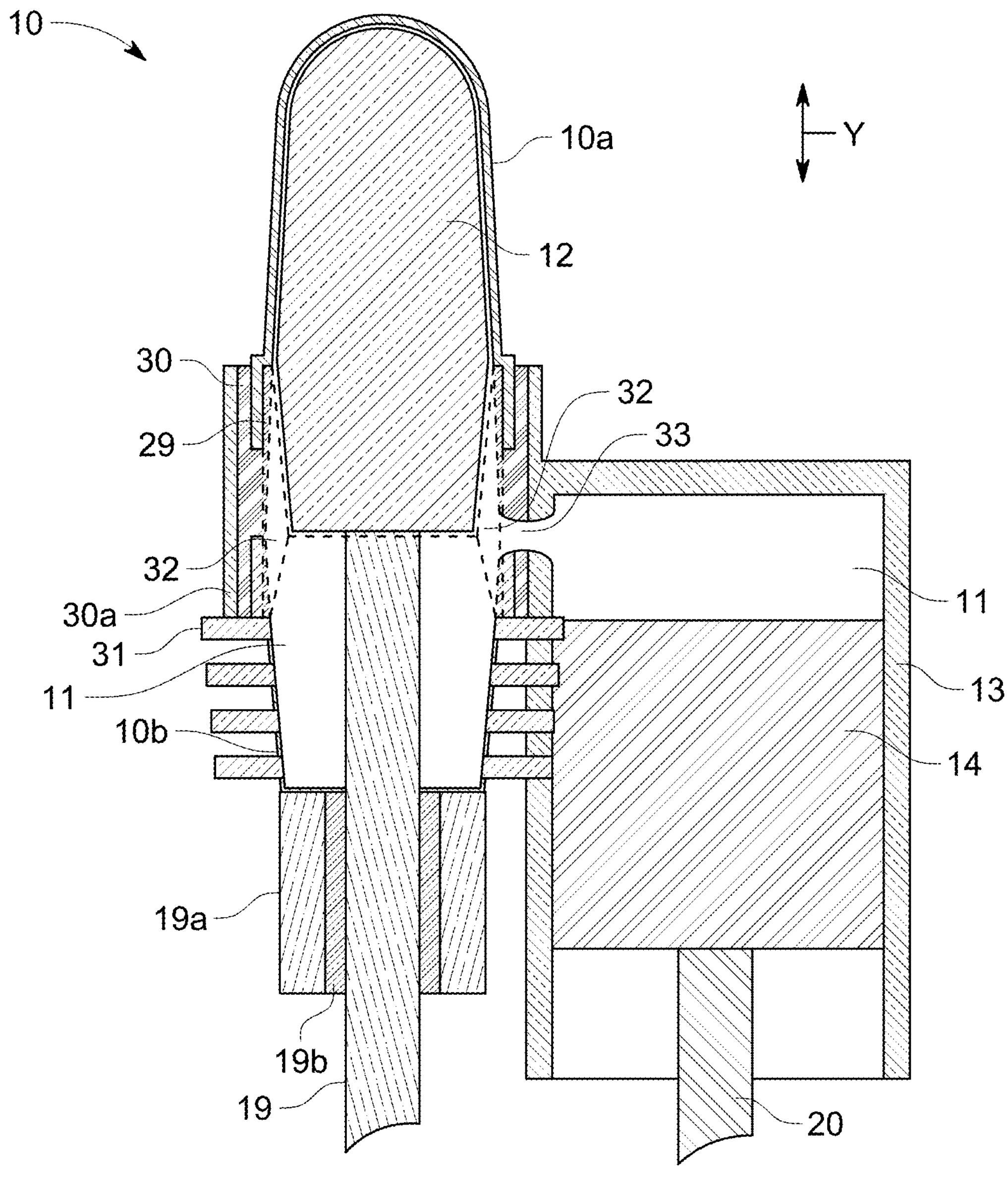
FIG. 1 is a diagrammatically illustrated cross-sectional view of an air cooled maximum delivery adiabatic hot-air engine with a minimal-sized chamber, incorporating the teachings of the present disclosure.

The air-cooled maximum delivery reciprocating adiabatic hot-air engine in FIG. 1 has a minimal-sized chamber 10 with a free interior space with an interior cross-sectional size that decreases incrementally from a chamber 10 maximum diameter to a single-wall hot cap 10*a* at one end and a single-wall cold cap 10*b* at an opposing end. The chamber 10 maximum interior height is three times the chamber 10 maximum interior diameter, The height from the hot cap 10*a* interior end to the chamber 10 maximum interior diameter is two-thirds the chamber 10 interior height, and the height from the cold cap 10*b* interior end to the chamber 10 maximum interior diameter is one-third the chamber 10 interior height. The hot cap 10*a* interior height is equal to two-thirds the hot cap 10*a* end interior height, and the cold cap 10*b* interior height is equal to two-thirds the cold cap 10*b* end interior height. Movable along the chamber 10 y-axis is a sealed isolator-displacer 12. The isolator-displacer 12 exterior height equals the hot cap 10*a* interior height plus the cold cap 10*b* interior height, The isolator-displacer 12 has an outer shape that mates with an inner shape of the hot cap 10*a* and the cold cap 10*b*. The isolator-displacer 12 is attached to an isolator-displacer rod 19 that slides within a rod guide seal 19*b* press fitted into a cold cap nose 19*a*.

Within the chamber 10 is a common space 32 that is determined by the intersection of space in the chamber 10 heated by the hot cap 10*a* when the isolator-displacer 12 is in mating contact with the cold cap 10*b* and space in the chamber 10 cooled by the cold cap 10*b* when the isolator-displacer 12 is in mating contact with the hot cap 10*a*. The outer boundary for the common space 32 is an insulator 29 that is made or coated with a low heat conducting material, such as zirconia. The insulator 29 is fitted into a coupler 30 that is joined to the hot cap 10*a* at one end and the cold cap 10*b* at the other end. The coupler 30 is fitted into a tube 30*a* that is joined to the piston cylinder 13 in a noncoaxial parallel configuration. At the widest diameter of the chamber 10 is an opening 33 through which a volume of working fluid 11 in the chamber 10 communicates thermally with a piston 14 in the piston cylinder 13. The piston 14 is connected to a piston rod 20. The stroke of the isolator-displacer 12 is approximately one-third the chamber 10 height.

The piston 14 has rounded grooves or rings (neither shown) as used in normal hot-air engine design to prevent the volume of working fluid 11 from leaking out of the engine between the piston 14 and the piston cylinder 13.

Figure 2:
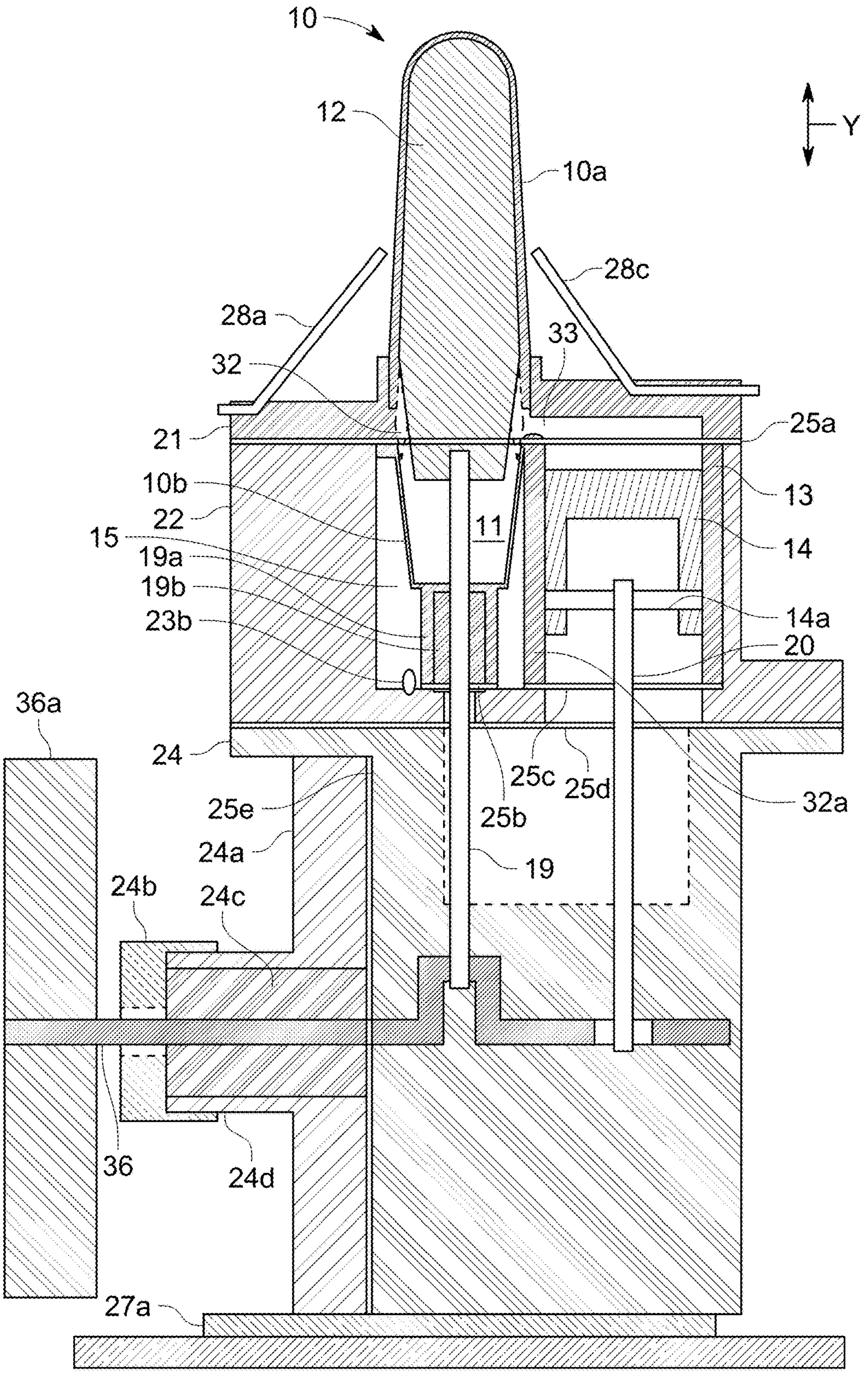
FIG. 2 is a diagrammatically illustrated cross-sectional view of a liquid cooled maximum delivery adiabatic hot-air engine with a minimal-sized chamber, incorporating the teachings of the present disclosure.
Figure 3:
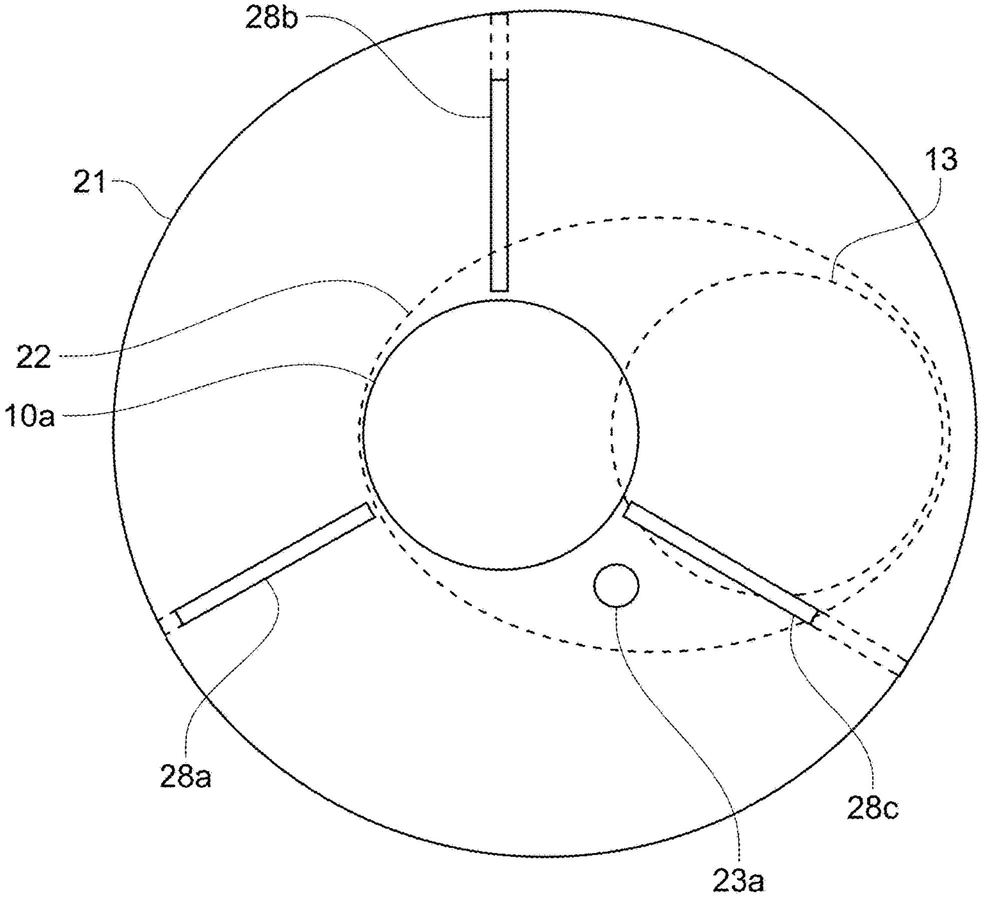
FIG. 3 is a diagrammatically illustrated top view of the pressurized liquid cooled maximum delivery adiabatic hot-air engine.

The liquid cooled maximum delivery reciprocating adiabatic hot-air engine in FIG. 2 has an engine block 21 consisting of a cold cap 10*b* and a piston cylinder 13 (joined in a noncoaxial parallel configuration), a water jacket 22, and a crankcase 24. The common space 32 has a common space wall 32*a* that is made or coated with a low heat conducting material. The chamber 10 is joined to a piston cylinder 13 at the common space wall 32*a* which bounds the common space 32 in a noncoaxial configuration, the chamber 10 and piston cylinder 13 having an opening 33 at the common space wall 32*a* through which a volume of working fluid 11 in the chamber 10 communicates thermally with a piston 14 in the piston cylinder 13. A portion of the common space wall 32*a* is a common wall between the chamber 10 and the piston cylinder 13. The isolator-displacer rod 19 and the piston rod 20 are attached to a crankshaft 36, which is attached to a flywheel 36*a* that stores mechanical energy and smooths power output. The engine block 21, water jacket 22, and crankcase 24 and crankcase cover 24*a* are sealed with gaskets 25*a*, 25*b*, 25*c*, 25*d*, 25*e* to contain the volume of working fluid 11 within the engine and to keep the volume of working fluid 11 separate from the coolant 15 that enters the engine through inlet 23*a* and exits the engine through outlet 23*b*. The crankshaft 36 is sealed with a packing gland 24*c*, stuffing box 24*d*, and packing nut 24*b*.

Figure 4:
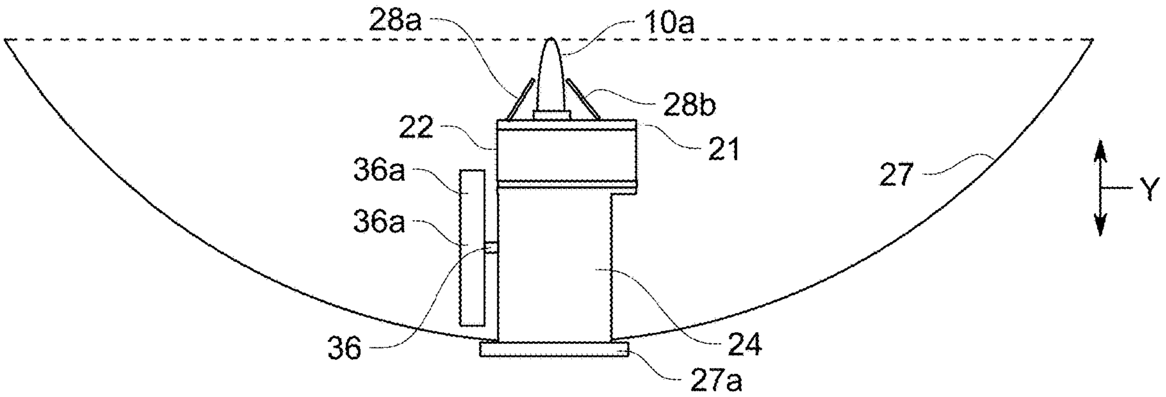
FIG. 4 is a diagrammatically illustrated view of the pressurized liquid cooled maximum delivery adiabatic hot-air engine mounted on a parabolic solar concentrator.
Figure 5:
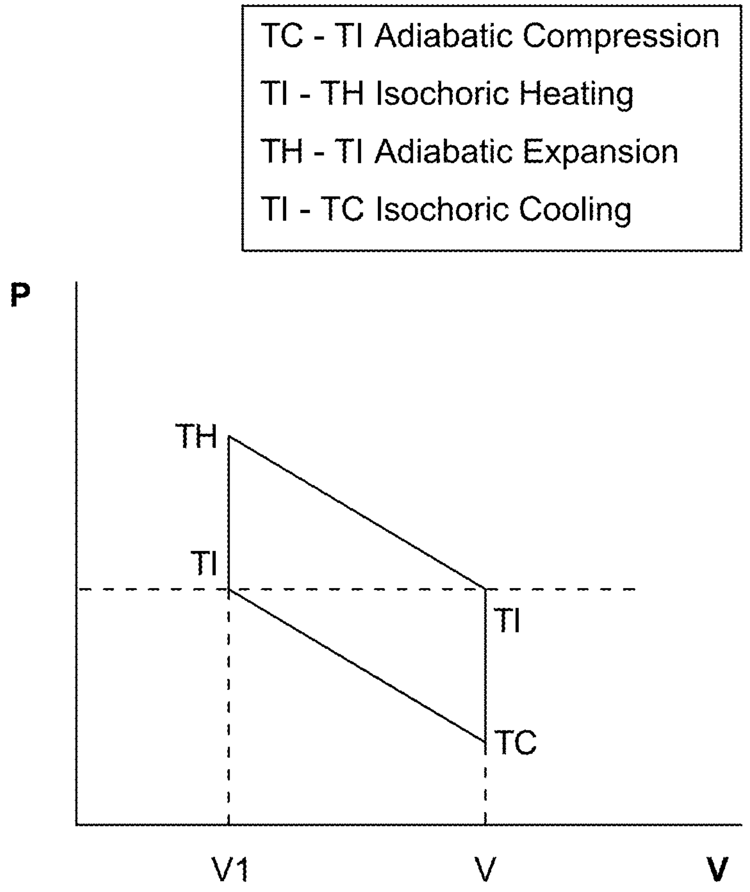
FIG. 5 is a P-V diagram of a thermodynamic cycle for an adiabatic hot-air engine.

The liquid cooled maximum delivery hot-air engine in FIG. 4 is mounted on a base 27*a* within a parabolic solar concentrator 27, which focuses solar radiation (not shown) on the hot cap 10*a* that is positioned at the focal point. Further, nozzles 28*a*, 28*b*, and 28*c* aid in heating or heat the hot cap 10*a* with combusted liquid fuel (not shown) when there is limited or no solar radiation, respectively.

The volume of working fluid 11 as well as the crankcase 24 can be initially pressurized to increase power. For operation, the piston 14 moves from bottom dead center towards top dead center along the y-axis compressing the volume of working fluid 11, thereby preheating adiabatically the volume of working fluid 11 to an intermediate temperature (TI) equal to the square root of the product of the interior maximum temperature (TH) and minimum temperature (TC). The isolator-displacer 12 then displaces the volume of working fluid 11 between the hot cap 10*a* and cold cap 10*b* within the cylinder thereby isolating the preheated volume of working fluid 11 from the cold cap 10*b* while the hot cap 10*a* (heated by a heat source, not shown) heats the volume of working fluid 11 isochorically to a maximum temperature (TH). The heated volume of working fluid 11 then passes through the opening 33 to expand adiabatically against the piston 14 and do work as the piston 14 moves from top dead center towards bottom dead center, which precools adiabatically the volume of working fluid 11 to its intermediate temperature (TI). The isolator-displacer 12 then cycles through top dead center isolating the precooled volume of working fluid 11 from the hot cap 10*a* while the cold cap 10*b* (cooled by a heat sink, i.e., air fins 31 or coolant 15) cool(s) the volume of working fluid 11 isochorically to its minimum temperature (TC). This repeating cycle of adiabatic and isochoric processes results in efficient useful work.

This configuration offers significant benefits because it maximizes work with the least amount of heat, the smallest dimensions, and the lowest cost, by: (1) providing a common space heated by the hot cap or cooled by the cold cap, the common space making up as much as 40% of minimum volume; (2) having a dead volume less than 1% of total volume of working fluid, which increases efficiency and power, and facilitates scaling up design; (3) optimizing isochoric processes by heating or cooling the volume of working fluid with only the hot cap or the cold cap, respectively; (4) permitting ideal proportions of hot and cold wetted areas; (5) maximizing the volume of working fluid alternately heated, compressed, cooled, and expanded; (6) maximizing specific power (w/kg); (7) providing a cycle and path for heat to do work cyclically rather than be "wasted" or "used many times over"; (8) having the volume of working fluid (heated to the maximum temperature) expand against the piston directly and with full effect; (9) minimizing chamber average diameter and maximizing rpm to well over 400 rpm, which minimizes the thickness of film layers in the hot and cold caps, thereby maximizing internal gas temperature delta; (10) taking advantage of the engine's natural tendency (when rpm is greater than 200) for adiabatic processes (the fastest of all thermodynamic processes) to preheat and precool the volume of working fluid to intermediate temperatures, thus minimizing required heat flux into and out of the engine, (Wagner *Calculations and Experiments on γ-Type Stirling Engines* p. 44, 2003 and Martini *Space Electric Power Design Study* pp. 52, 54, 1978); (11) benefitting from isochoric processes (the second fastest thermodynamic process) to heat and cool isochorically the volume of working fluid as the isolator-displacer respectively cycles through bottom dead center and top dead center, stopping at both; (12) maximizing the compression ratio, i.e., maximum volume of working fluid divided by minimum volume of working fluid; (13) maximizing heat flux through single-wall hot cap hot-air engines; (14) minimizing dimensions; (15) minimizing flow resistance and drag friction losses; (16) minimizing design and manufacturing complexity, and thus minimizing manufacturing and material costs; (17) minimizing the distance between the chamber and the piston cylinder; (18) utilizing streamlined shapes with reduced drag coefficients, which in turn reduce drag friction that is proportional to the square of the speed (Brill, "Optimization of Stirling Engine Power Output Through Variation of Choke Point Diameter and Expansion Space Volume", 2011); and (19) utilizing aerodynamic shapes that minimize mass and moving mass with thin walls that maximize heat flux into and out of the engine, without compromising tensile strength or integrity.

In the case of the present disclosure, a maximum delivery adiabatic hot-air engine is provided that has many uses, including: producing power, particularly stationary power applications of 10 hp or less; heating space; heating water; producing micro combined heat and power; and charging or topping off battery banks. The engine may be coupled to a generator to produce electricity, heated by any type of thermal energy, including solar radiation or combusted liquid fuel or both. The engine may also be connected to an external power, such as an electric motor, to reverse the thermodynamic cycle to abstract heat. These are all intended to be included within the scope and concept of the present disclosure.

Although the maximum delivery adiabatic hot-air engine has been explained in relation to its embodiments as mentioned above, those in the art will understand that many other possible materials, modifications, and variations, now known or hereafter developed, can be used without departing from the scope of the present disclosure, including: modifying proportions of the chamber, isolator-displacer, piston cylinder, stroke, bore/stroke ratio; isolator-displacer rod, and piston rod; pressurizing the crankcase with non-return valves; adjusting the phase angle; utilizing air or gases or mixtures of the same for the volume of working fluid; scaling the crankshaft with rotating O-rings, V-rings, packing glands, or other components and methods; sealing the rod guide seal with O-rings or other types of seals; manufacturing the cold cap and power cylinder jointly or separately; balancing rotating mass; coating or making components with low heat conducting materials, such as ultra-high temperature ceramics and thermal barrier coatings; making or coating parts subject to friction with non-lubricating materials with a low-coefficient of friction; employing multiple chambers and piston cylinders, or both; casting, manufacturing, machining, joining, coupling, lubricating, and/or driving the components described herein. It is, therefore, contemplated that the claims will cover such materials, modifications, and variations that fall within the true scope and concept of the present disclosure.

What is claimed is:

1. A minimal-sized chamber for a hot-air engine, comprising:

a. an interior space, a volume of working fluid, a first end, a second end positioned oppositely to said first end, a maximum interior chamber height extending from said first end to said second end, a maximum interior chamber diameter, and an interior cross-sectional size decreasing incrementally from said chamber maximum interior diameter to said first end and to said second end, wherein said engine excludes a regenerator;

b. a hot cap and a cold cap each comprising an inner shape, said hot cap positioned at said first end and said cold cap positioned at said second end, wherein said hot cap or said cold cap is characterized by a single wall between said volume of working fluid and a heat source or heat sink, respectively;

c. a sealed isolator-displacer movable within said chamber between said hot cap and said cold cap, said isolator-displacer characterized by an exterior cross-sectional size that decreases incrementally from an isolator-displacer maximum diameter to each end thereof, wherein said isolator-displacer is also characterized by an outer shape that mates with said inner shape of said hot cap and said cold cap, wherein said isolator-displacer alternately displaces said volume of working fluid around said isolator-displacer between said hot cap and said cold cap while exposing said volume of working fluid to said hot cap when said isolator-displacer is at bottom dead center along said y-axis, and said isolator-displacer isolates said volume of working fluid from said hot cap while exposing said volume of working fluid to said cold cap when said isolator-displacer is at top dead center; and d. a common space determined by an intersection of space in said chamber heated by said hot cap when said isolator-displacer is at bottom dead center or cooled by said cold cap when said isolator-displacer is at top dead center, said common space having an insulator or a common space wall as an outer boundary.

2. The chamber of claim 1, wherein said chamber has an opening through said insulator or said common space wall.

3. The chamber of claim 1, wherein a height of said hot cap is less than a height from said chamber maximum interior diameter to said first end, and a height of said cold cap is less than a height from said chamber interior maximum diameter to said second end, and an isolator-displacer height equals said hot cap height plus said cold cap height, and a stroke of said isolator-displacer equals said maximum interior chamber height less said isolator-displacer height.

4. A maximum delivery adiabatic reciprocating hot-air engine, comprising:

a. a minimal-sized chamber comprising: an interior space, a volume of working fluid, a first end, a second end positioned oppositely to said first end, a maximum interior chamber height extending from said first end to said second end along, a maximum interior chamber diameter, and an interior cross-sectional size decreasing incrementally from said chamber maximum interior diameter to said first end and to said second end, wherein said engine excludes a regenerator;

b. a hot cap and a cold cap each comprising an inner shape, said hot cap positioned at said first end and said cold cap positioned at said second end, wherein said hot cap and said cold cap are characterized by a single wall between said volume of working fluid and a heat source or heat sink, respectively;

c. a sealed isolator-displacer movable within said chamber between said hot cap and said cold cap, said isolator-displacer characterized by an exterior cross-sectional size that decreases incrementally from an isolator-displacer maximum diameter to each end thereof, wherein said isolator-displacer is also characterized by an outer shape that mates with said inner shape of said hot cap and said cold cap, wherein said isolator-displacer alternately displaces said volume of working fluid around said isolator-displacer between said hot cap and said cold cap while exposing said volume of working fluid to said hot cap when said isolator-displacer is at bottom dead center along said y-axis, and said isolator-displacer isolates said volume of working fluid from said hot cap while exposing said volume of working fluid to said cold cap when said isolator-displacer is at top dead center;

d. a common space determined by an intersection of space in said chamber heated by said hot cap when said isolator-displacer is at bottom dead center or cooled by said cold cap when said isolator-displacer is at top dead center, said common space having a common space wall as an outer boundary; and e. a piston cylinder joined to said chamber at said chamber maximum interior diameter, wherein said volume of working fluid thermally communicates directly and with full effect against a piston through said opening.

5. The engine of claim 4, wherein said common space wall is an insulator or coated with a low thermal conductivity material.

6. The engine of claim 4, wherein a distance between said chamber and said piston cylinder is minimal, wherein said volume of working fluid thermally communicates with said piston through said opening in said common space wall.

7. The engine of claim 4, wherein said engine has a dead volume less than 1% of said volume of working fluid.

8. The engine of claim 4, wherein a height of said hot cap is less than a height from said chamber maximum interior diameter to said first end, and a height of said cold cap is less than a height from said chamber maximum interior diameter to said second end, and an isolator-displacer height equals said hot cap height plus said cold cap height, and a stroke of said isolator-displacer equals said maximum interior chamber height less said isolator-displacer height.

9. The engine of claim 4, wherein said isolator-displacer is made or coated with a material having a low thermal conductivity.

10. The engine of claim 4, further comprising an engine block, wherein said engine block comprises said cold cap and said piston cylinder, wherein a portion of said common space wall is a common wall between said chamber and said piston chamber.

11. The engine of claim 4, wherein said piston moves reciprocally to compress and expand adiabatically said volume of working fluid to an intermediate temperature equal to the square root of the product of a maximum and a minimum temperature.

12. The engine of claim 4, wherein said engine is configured to be pressurized.

13. The engine of claim 4, wherein said engine is configured to heat and cool isochorically said volume of working fluid to said maximum and minimum temperatures, respectively.

14. The engine of claim 4, wherein said engine heats at least one of air and water.

15. The engine of claim 4, wherein said engine is mounted within a confines of a parabolic solar concentrator.

16. The engine of claim 4, wherein said engine is heated with at least one of solar radiation and combusted liquid fuel.

17. A method of operating a maximum delivery reciprocating hot-air engine, comprising:

a. providing a minimal-sized chamber comprising an interior space; a sealed isolator-displacer, a common space, a piston cylinder, and a piston, said chamber comprising a hot cap and a cold cap, and being configured to retain a volume of working fluid, said isolator-displacer and chamber being characterized by a wider diameter than ends, said isolator-displacer characterized by an exterior shape that mates with an interior shape of said hot and cold caps;

b. compressing adiabatically said volume of working fluid to preheat said volume of working volume to an intermediate temperature equal to the square root of the product of a maximum and a minimum temperature;

c. heating isochorically said volume of working fluid with said hot cap to a maximum interior temperature;

d. expanding adiabatically said volume of working fluid to do work and precool said volume of working fluid to said intermediate temperature; and e. cooling isochorically said volume of working fluid with said cold cap to a minimum interior temperature, wherein said engine excludes a regenerator.

18. The method of claim 17, wherein said common space is determined by an intersection of space in said chamber heated by said hot cap when said isolator-displacer is at bottom dead center or cooled by said cold cap when said isolator-displacer is at top dead center, said common space having an insulator or a common space wall as an outer boundary.

19. The method of claim 17, wherein said piston cylinder is joined to said chamber in a parallel noncoaxial configuration, wherein said volume of working fluid thermally communicates with said piston cylinder through an opening at said common wall.

20. The method of claim 17, wherein said engine has a dead volume less than 1% of said volume of working fluid.

* * * * *